US 9,561,816 B2

(12) United States Patent
Dowd et al.

(10) Patent No.: US 9,561,816 B2
(45) Date of Patent: Feb. 7, 2017

(54) COMPACT FOLDABLE STROLLER WITH ONE-HANDED FOLD CONTROL

(71) Applicant: Dorel Juvenile Group, Inc., Foxboro, MA (US)

(72) Inventors: Paul Dowd, Scarsdale, NY (US); Christopher D Miller, Bronxville, NY (US); Joseph F Brewin, Franklin, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 99 days.

(21) Appl. No.: 14/594,399

(22) Filed: Jan. 12, 2015

(65) Prior Publication Data

US 2015/0197268 A1 Jul. 16, 2015

Related U.S. Application Data

(60) Provisional application No. 61/926,078, filed on Jan. 10, 2014.

(51) Int. Cl.
*B62B 7/10* (2006.01)
*B62B 7/08* (2006.01)
*B62B 7/06* (2006.01)

(52) U.S. Cl.
CPC ............... *B62B 7/08* (2013.01); *B62B 7/062* (2013.01); *B62B 7/064* (2013.01); *B62B 2205/20* (2013.01)

(58) Field of Classification Search
CPC .................................. B62B 7/10; B62B 7/105
USPC ........................................ 280/642, 647, 650
See application file for complete search history.

(56) References Cited

U.S. PATENT DOCUMENTS

| | | | |
|---|---|---|---|
| 400,478 A | 4/1889 | Paine | |
| 583,719 A | 6/1897 | Wilhelm et al. | |
| 585,336 A | 6/1897 | Foss | |
| 585,337 A | 6/1897 | Gessler | |
| 585,338 A | 6/1897 | Gutiirie | |
| 593,007 A | 11/1897 | Bean | |
| 601,467 A | 3/1898 | Heise | |
| 602,819 A | 4/1898 | William | |
| 608,254 A | 8/1898 | Eisenmann | |
| 614,541 A | 11/1898 | Fischer | |
| 615,461 A | 12/1898 | Peirce | |
| 617,239 A | 1/1899 | Eastman | |
| 667,760 A | 2/1901 | Benton | |
| 5,988,670 A | 11/1999 | Song et al. | |
| 6,068,284 A | 5/2000 | Kakuda | |
| 6,095,548 A * | 8/2000 | Baechler | B62B 7/062 280/642 |
| 6,102,431 A * | 8/2000 | Sutherland | B62B 7/062 280/47.17 |
| 6,155,740 A | 12/2000 | Hartenstine | |
| 6,766,930 B2 | 7/2004 | Dixon et al. | |

(Continued)

FOREIGN PATENT DOCUMENTS

CA 2357334 A1 7/2002
CA 2367260 A1 7/2002

(Continued)

*Primary Examiner* — Jeffrey J Restifo
(74) *Attorney, Agent, or Firm* — Barnes & Thornburg LLP (57) ABSTRACT

A compact collapsible stroller in accordance with the present disclosure includes a mobile cart and a seat coupled to the mobile cart. The mobile cart includes a rolling base and a foldable frame that fold inwardly and outwardly from the rolling base.

13 Claims, 8 Drawing Sheets

(56) References Cited

U.S. PATENT DOCUMENTS

| | | | |
|---|---|---|---|
| 6,827,365 B2 | 12/2004 | Yeh | |
| 6,877,760 B2 | 4/2005 | Wang | |
| 6,910,708 B2 | 6/2005 | Sack et al. | |
| 6,921,102 B2 | 7/2005 | Hsia | |
| 7,021,650 B2 | 4/2006 | Chen | |
| 7,422,230 B2 | 9/2008 | Chuan | |
| 7,510,208 B1 | 3/2009 | Lochmueller | |
| 7,543,840 B2* | 6/2009 | Lin | B62B 3/02 280/38 |
| 7,658,399 B2 | 2/2010 | Van Dijk | |
| 7,832,756 B2 | 11/2010 | Storm | |
| 8,033,555 B2 | 10/2011 | Mostert et al. | |
| 8,066,300 B2* | 11/2011 | Ohnishi | B62B 7/08 280/47.25 |
| 8,191,919 B2* | 6/2012 | Wang | B62B 7/08 280/642 |
| 8,215,661 B2 | 7/2012 | Van Dijk | |
| 8,322,744 B2* | 12/2012 | Ahnert | B62B 9/20 280/47.4 |
| 8,496,263 B2 | 7/2013 | Wu et al. | |
| 8,628,109 B2 | 1/2014 | Daley et al. | |
| 8,696,015 B2* | 4/2014 | Karremans | B62B 7/062 280/642 |
| 8,783,708 B2 | 7/2014 | Storm et al. | |
| 8,789,843 B2 | 7/2014 | Pearce | |
| 8,844,960 B2 | 9/2014 | Young et al. | |
| 8,870,213 B1* | 10/2014 | Xu | B62B 7/08 280/642 |
| 8,936,267 B2 | 1/2015 | Li et al. | |
| 8,985,616 B1* | 3/2015 | Chen | B62B 7/062 280/47.38 |
| 8,991,854 B2* | 3/2015 | Greger | B62B 7/08 280/650 |
| 9,085,312 B2* | 7/2015 | Liu | B62B 7/08 |
| 9,193,373 B2* | 11/2015 | Fjelland | B62B 7/08 |
| 9,315,205 B2* | 4/2016 | Chuah | B62B 7/062 |
| 2002/0093157 A1 | 7/2002 | Turner et al. | |
| 2002/0093158 A1 | 7/2002 | Turner et al. | |
| 2002/0093159 A1 | 7/2002 | Turner et al. | |
| 2002/0093160 A1 | 7/2002 | Mendenhall | |
| 2002/0093178 A1 | 7/2002 | Turner et al. | |
| 2002/0109321 A1 | 8/2002 | Turner et al. | |
| 2003/0218306 A1 | 11/2003 | Dixon et al. | |
| 2005/0098981 A1 | 5/2005 | Chang | |
| 2006/0071451 A1* | 4/2006 | Cheng | B62B 7/008 280/642 |
| 2006/0082104 A1* | 4/2006 | Wun | B62B 7/062 280/650 |
| 2009/0115151 A1 | 5/2009 | Van Dijk | |
| 2009/0121454 A1* | 5/2009 | Tomasi | B62B 7/08 280/642 |
| 2009/0256406 A1 | 10/2009 | Schrooten | |
| 2010/0127480 A1* | 5/2010 | Ahnert | B62B 7/08 280/647 |
| 2011/0012325 A1* | 1/2011 | Gower | B62B 7/008 280/648 |
| 2012/0025491 A1* | 2/2012 | Li | B62B 7/083 280/642 |
| 2012/0049485 A1* | 3/2012 | Lin | B62B 7/068 280/647 |
| 2012/0056408 A1 | 3/2012 | Wu et al. | |
| 2012/0086187 A1 | 4/2012 | Daley et al. | |
| 2012/0187660 A1* | 7/2012 | Liao | B62B 7/086 280/642 |
| 2012/0292888 A1* | 11/2012 | Lai | B62B 7/086 280/650 |
| 2013/0113186 A1* | 5/2013 | Rembisz | B62B 7/06 280/647 |
| 2014/0327233 A1* | 11/2014 | Greger | B62B 7/08 280/650 |
| 2014/0339793 A1* | 11/2014 | Xu | B62B 7/08 280/650 |
| 2014/0339794 A1 | 11/2014 | Pearce | |
| 2015/0008659 A1* | 1/2015 | Chang | B62B 7/08 280/650 |
| 2015/0197268 A1* | 7/2015 | Dowd | B62B 7/08 280/650 |
| 2015/0321689 A1* | 11/2015 | Liu | B62B 7/08 280/650 |

FOREIGN PATENT DOCUMENTS

| | | |
|---|---|---|
| CA | 2367263 A1 | 7/2002 |
| CA | 2367545 A1 | 7/2002 |
| CA | 2367558 A1 | 7/2002 |
| CA | 2367580 A1 | 7/2002 |

* cited by examiner

COMPACT FOLDABLE STROLLER WITH ONE-HANDED FOLD CONTROL

PRIORITY CLAIM

This application claims priority under 35 U.S.C. §119(e) to U.S. Provisional Application Ser. No. 61/926,078, filed Jan. 10, 2014, which is expressly incorporated by reference herein.

BACKGROUND

The present disclosure relates to collapsible strollers for juveniles, and particularly to strollers including a collapsible frame assembly, a seat, and several wheels. More particularly, the present disclosure relates to collapsible frame assemblies for juvenile strollers.

Juvenile strollers are used widely to transport young children. Foldable strollers including collapsible frame assemblies that can be placed in vehicle trunks or storage areas. Caregivers appreciate compact foldable strollers that are easy to fold and that do not require a lot of storage space so that space is available onboard a vehicle or elsewhere for storage of other items.

SUMMARY

A compact collapsible stroller in accordance with the present disclosure includes a mobile cart and a seat coupled to the mobile cart. The mobile cart includes a foldable frame that supports the seat.

In illustrative embodiments, the mobile cart of the stroller comprises a rolling base, a foldable frame mounted on the rolling base, and a frame-motion controller adapted to control movement of the foldable frame relative to the rolling base. The foldable frame includes a base stabilizer having a front wheel and a base pusher having a push handle each coupled to the rolling base to pivot about respective pivot axes. The frame-motion controller includes a pivot lock with a fold handle for freeing the foldable frame components to fold in and a movement linkage that coordinates movement of the base stabilizer and the base pusher so that they are simultaneously folded-in or folded out relative to the rolling base.

In illustrative embodiments, the foldable frame moves between a folded-out position for supporting a child and a folded-in position for storage of the stroller. The pivot lock of the frame-motion controller operates to block or allow movement of the foldable frame from the folded-out position to the folded-in position. The pivot lock includes left and right locking units and a fold handle that interconnects the locking units. The fold handle extends through the seat and is accessible to a caregiver when a child is not supported in the seat. When a caregiver pulls the fold handle, the pivot lock allows movement of the foldable frame from the folded-out position to the folded-in position.

In illustrative embodiments, each locking unit of the pivot lock includes a housing coupled to the rolling base, a motion blocker mounted in the housing to slide within the housing, and a lever coupled to the fold handle and mounted to the rolling base to pivot when a caregiver pulls the fold handle. The motion blocker slides between a first position arranged to block the components of the foldable frame from pivoting about their respective axes and a second position arranged to allow the components of the foldable frame to pivot about their respective axes. The lever pivots to push the motion blocker to the second position when a user pulls the fold handle.

In illustrative embodiments, the movement linkage of the frame-motion controller includes left and right links that couple the base stabilizer and the base pusher. The left and right links are coordinate movement of the base stabilizer and the base pusher during motion of the foldable frame between the folded-out position and the folded-in position. Each link of the movement linkage is pivotably coupled to a stabilizer-link support included in the base stabilizer and to a pusher-link support included in the base pusher. The stabilizer-link support is offset from the pivot axis about which the base stabilizer pivots relative to the rolling base and the pusher-link support is offset from the pivot axis about which the base pusher pivots relative to the rolling base. Each link of the movement linkage is illustratively a generally z-shaped rod with ends received in the stabilizer-link support and in the pusher-link support.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5B is a detailed exploded perspective view of a portion of the mobile cart showing that the frame-motion controller includes the pivot lock for freeing the foldable frame components to move about their respective axes and a movement linkage that coordinates movement of the frame components about their respective pivot axes, showing that a left locking unit of the pivot lock includes a housing coupled to the rolling base, a motion blocker mounted in the housing to slide within the housing between a locked and an unlocked position, and a lever pivotably mounted to the rolling base to push the motion blocker from the locked position to the unlocked position when a caregiver lifts upwardly on the fold handle, and showing that a left link included in the movement linkage of the frame-motion controller is adapted to be coupled to the base stabilizer and the base pusher to coordinate movement of the base stabilizer and the base pusher during motion of the foldable frame between the folded-out position and the folded-in position;

DETAILED DESCRIPTION

Figure 1:
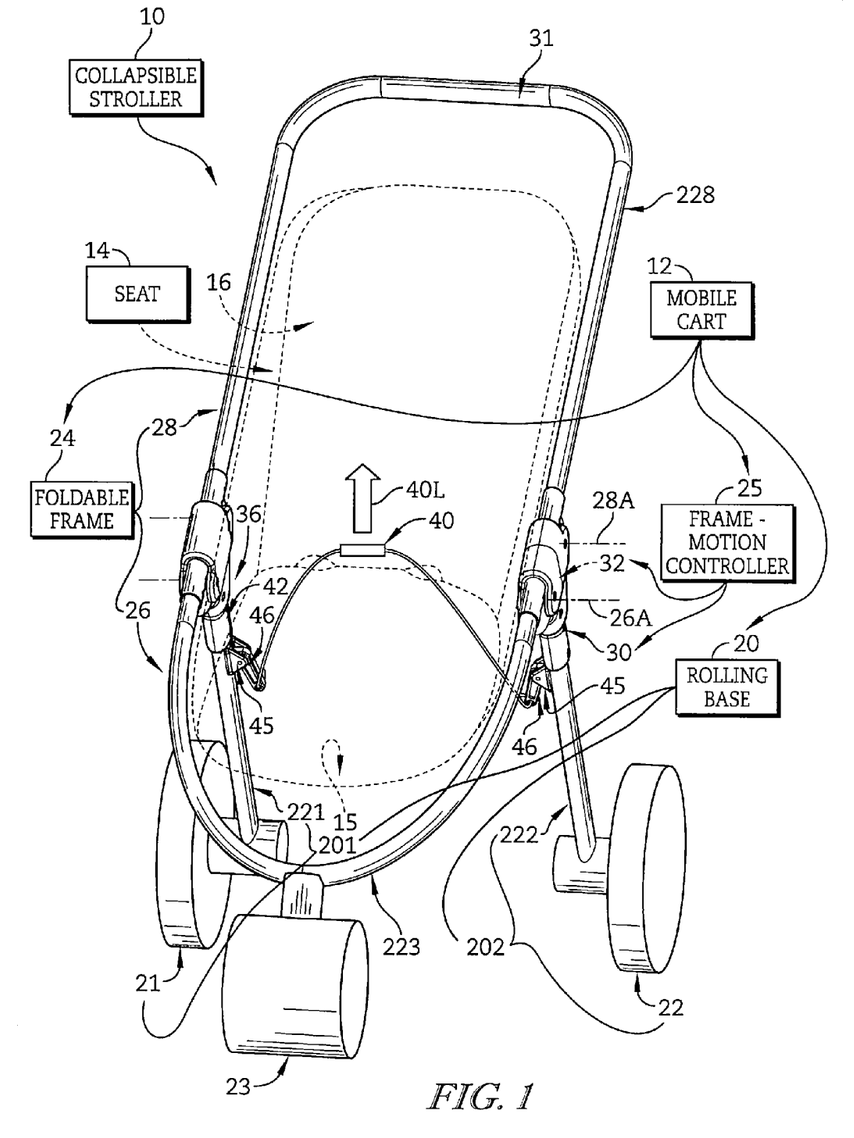
FIG. 1 is a perspective view of a collapsible stroller (with fabric coverings omitted) that is adapted to be reconfigured from an expanded-use mode, shown in FIG. 2, to a collapsed-storage mode, shown in FIG. 4, showing that the stroller includes a mobile cart and a seat (shown in phantom) and showing that the mobile cart includes a rolling base having rear wheels, a foldable frame coupled to the rolling base to provide a base stabilizer with a front wheel and a base pusher with a push handle, and a frame-motion controller adapted to provide one-handed collapsing of the foldable frame in response to a caregiver lifting upwardly on a fold handle that extends through the seat.
Figure 2:
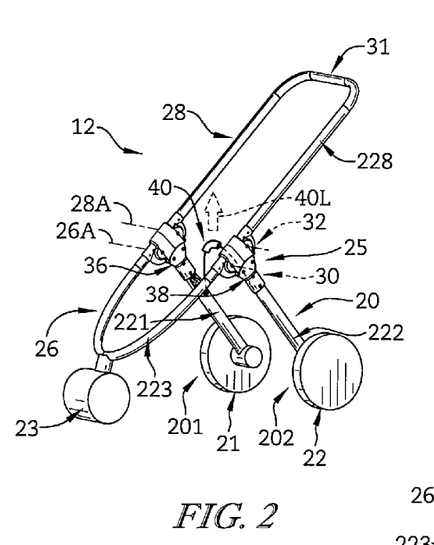
FIG. 2 is a perspective view of the mobile cart the stroller in FIG. 1 showing the foldable frame in a folded-out position before a caregiver lifts upwardly on the fold handle to unlock a pivot lock included in the frame-motion controller to free the base stabilizer and the base pusher to pivot relative to the rolling base so that the foldable frame can be moved to a folded-in position (corresponding to the collapsed-storage mode of the stroller) from the folded-out position (corresponding to the expanded-use mode of the stroller) as shown in FIGS. 3 and 4.
Figure 3:
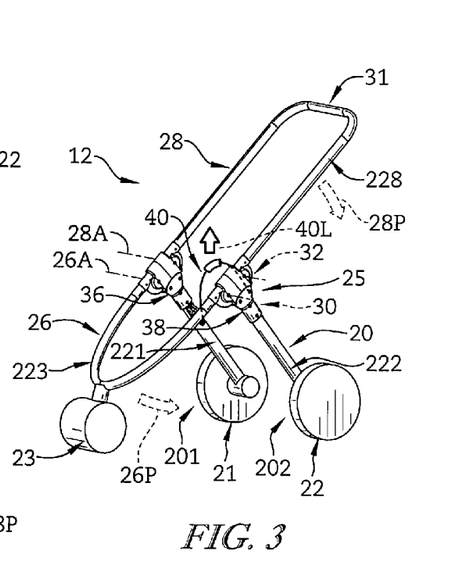
FIG. 3 is a view similar to FIG. 2 showing the mobile cart fold handle pulled upwardly so that the pivot lock included in the frame-motion controller is unlocked and foldable frame components are free to pivot relative to the rolling base such that the foldable frame can be moved to the folded-in position as shown in FIG. 4.
Figure 4:
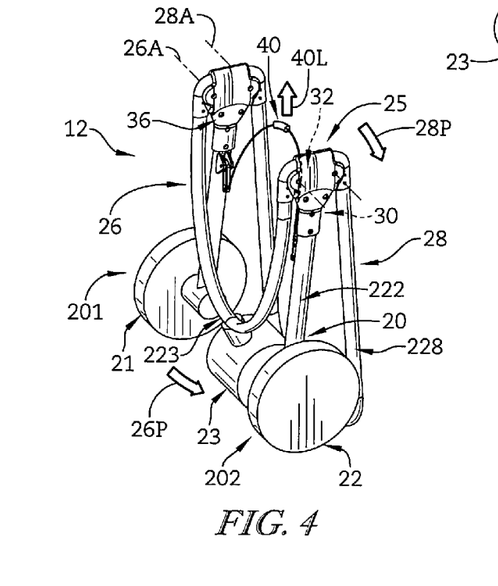
FIG. 4 is a view similar to FIGS. 2 and 3 showing the foldable frame moved to the folded-in position after the base stabilizer and the base pusher are pivoted relative to the rolling base about respective axes.

A compact collapsible stroller 10 in accordance with the present disclosure is shown in FIG. 1 and is adapted to move from an expanded-use mode to a collapsed-storage mode as shown in FIGS. 2-4. The stroller 10 illustratively includes a mobile cart 12 and a seat 14 coupled to mobile cart 12 as shown in FIG. 1. Mobile cart 12 of compact collapsible stroller 10 includes a rolling base 20, a foldable frame 24 mounted on rolling base 20, and a frame-motion controller 25. Frame-motion controller 25 allows a user to collapse the stroller 10 by folding the foldable frame 24 in toward the rolling base 20 using only one-hand to lift up on a fold handle 40 as suggested in FIGS. 1-4.

Rolling base 20 of the mobile cart 12 illustratively includes a left leg 201 and a right leg 202 as shown in FIG. 1. Each leg includes a corresponding left or right frame member 221, 222 and a corresponding left or right rear wheel 21, 22 as shown in FIG. 1. Frame members 221, 222 extend upwardly from the rear wheels 21, 22 and frame-motion controller 25 is coupled to the frame members 221, 222 opposite the rear wheels 21, 22.

Foldable frame 24 includes a base stabilizer 26 having a front wheel 23 and a base pusher 28 having a push handle 31 as shown in FIG. 1. Base stabilizer 26 is coupled to rolling base 20 for pivotable movement about a stabilizer-pivot axis 26A. Base pusher 28 is coupled to rolling base 20 for movement about a pusher-pivot axis 28A that is arranged to lie in spaced-apart relation stabilizer-pivot axis 26A. Base stabilizer 26 and base pusher 28 of the foldable frame 24 are arranged to move relative to rolling base 20 as suggested by arrows 26P, 28P from a folded-out position (corresponding to the expanded-use mode of stroller 10) shown in FIG. 2 to a folded-in position (corresponding to the collapsed-storage mode of stroller 10) shown in FIG. 4.

Figure 13:
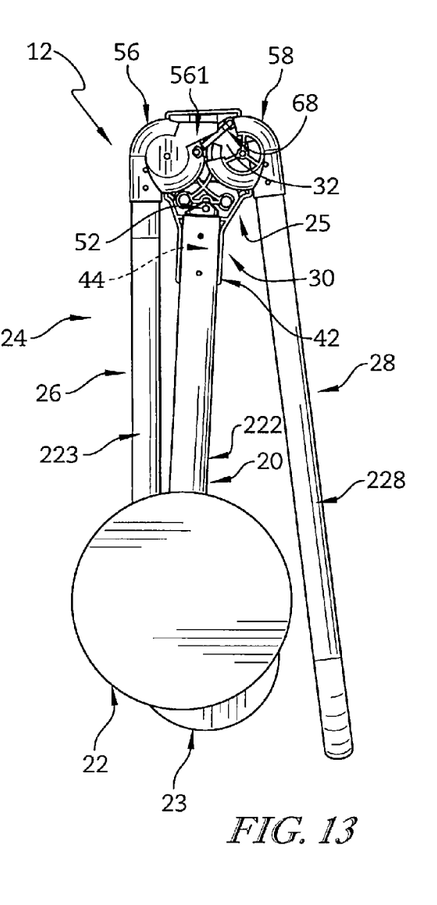
FIG. 13 is a side elevation view of the mobile cart corresponding to the mobile cart of FIG. 4 showing the foldable frame of the mobile cart in the folded-in position and the pivot lock of the frame-motion controller in the unlocked position allowing movement of the foldable frame to the folded-out position.

In the folded-out position, the base stabilizer 26 and the base pusher 28 extend away from the rolling base 20 to support a child sitting on a seat mounted to the mobile cart when the mobile cart is in use as shown, for example, in FIGS. 1-3 and 12. In the folded-in position, the base stabilizer 26 and the base pusher 28 extend along the rolling base 20 reducing the footprint of the mobile cart 12 to allow storage of the mobile cart 12 and the stroller 10 as shown in FIGS. 4 and 13.

Frame-motion controller 25 is illustratively adapted to provide fold means (1) for releasing foldable frame 24 to move from a folded-out position in which base stabilizer 26 and base pusher 28 extend away from rolling base 20 to support a child sitting on a seat mounted to mobile cart 12 when mobile cart 12 is in use to a folded-in position in which base stabilizer 26 and base pusher 28 extend along rolling base 20 reducing the footprint of mobile cart 12 to allow storage of mobile cart 12 and stroller 10 in response to a user lifting upwardly with one hand on fold handle 40 included in frame-motion controller 25 and (2) for coordinating movement of base stabilizer 26 included in foldable frame 24 and base pusher 28 included in foldable frame 24 as they move from the folded-out position to the folded-in position in response to continued upward lifting of fold handle 40 with one hand by a user that causes a gravitational force to pull base stabilizer 26 and base pusher 28 of foldable frame 24 toward the folded-in position so that a user can move foldable frame 24 from the folded-out position to the folded-in position for storage using only a first hand freeing a second hand to carry a child.

Figures 5A, 5B:
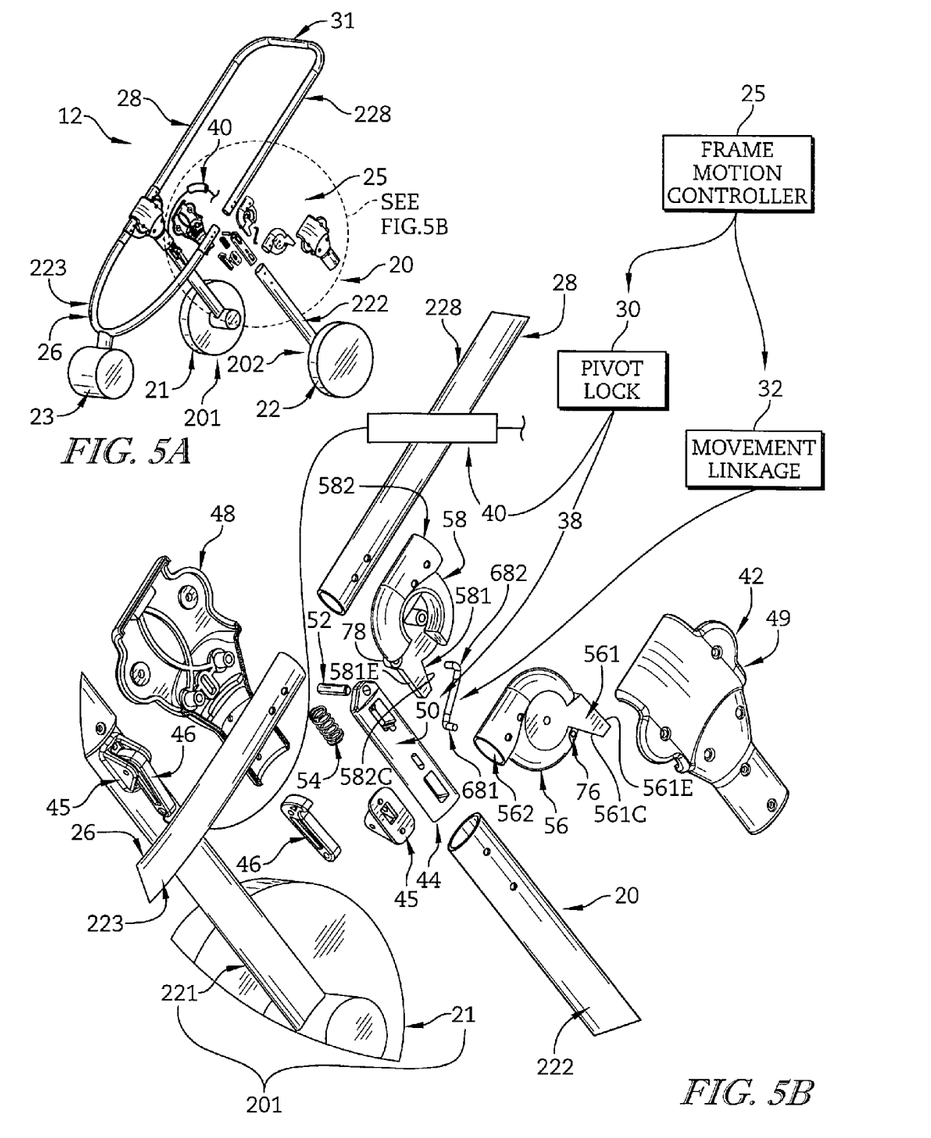
FIG. 5A is a perspective view of the mobile cart with a portion of the mobile cart exploded to show the components of the frame-motion controller along a right side of the mobile cart as shown in more detail in FIG. 5B.

In the illustrative embodiment, frame-motion controller 25 includes a pivot lock 30 and a movement linkage 32 that interconnects the base stabilizer 26 and the base pusher 28 during movement of the foldable frame 24 as shown in FIG. 5B. Pivot lock 30 of the frame-motion controller 25 blocks or allows movement of the foldable frame 24 from the folded-out position to the folded-in position. Movement linkage 32 of frame-motion controller 25 coordinates movement of the base stabilizer 26 and the base pusher 28 during motion of the foldable frame 24 between the folded-out position to the folded-in position.

Pivot lock 30 illustratively includes left and right locking units 36, 38 and a fold handle 40 that extends between and interconnects the locking units 36, 38 as shown in FIG. 1. Left locking unit 36 is coupled to left leg 221 of the rolling base 20 and is arranged along a left side of the mobile cart 12. Right locking unit 38 is coupled to right leg 222 of the rolling base 20 and is arranged along a right side of the mobile cart 12. Fold handle 40 is illustratively a flexible band or strip of material that extends through the seat 14. Fold handle 40 is accessible to a caregiver when a child is not supported in seat 14. When a caregiver pulls fold handle 40 upwardly as suggested by arrow 40U, pivot lock 30 moves from a locked mode to an unlocked mode to allow movement of the foldable frame 24 from the folded-out position to the folded-in position.

Figure 14:
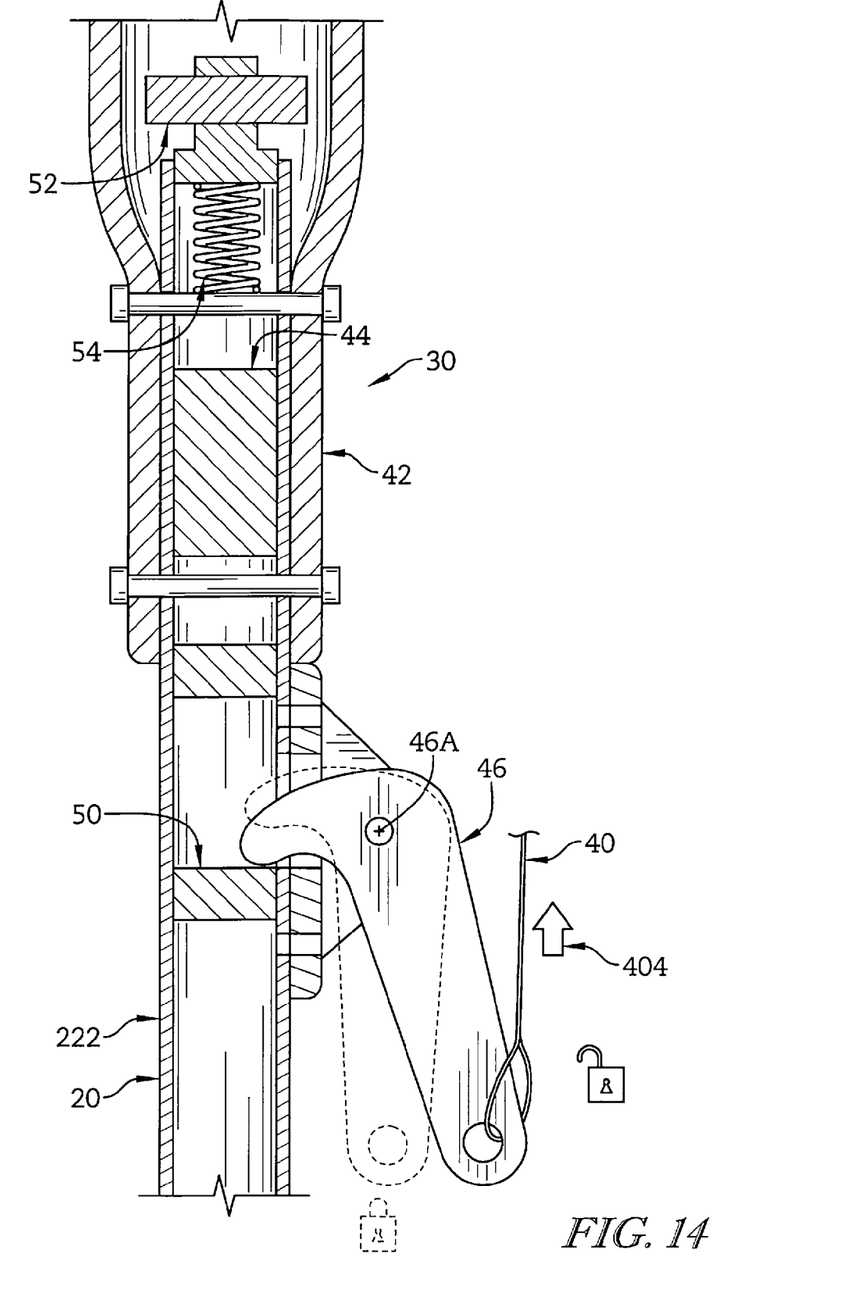
FIG. 14 is a partial cross-sectional view of FIG. 8 taken along line 14-14 showing the lever included in the left locking unit of the pivot lock pivoted to push the motion blocker in response to a caregiver pulling upwardly on the fold handle so that the pivot lock is in the unlocked position.

Each locking unit 36, 38 of pivot lock 30 is substantially similar and right locking unit 38 shown in FIG. 5B is representative of left locking unit 36. Locking unit 38 includes a housing 42, a motion blocker 44, and a lever 46 as shown in FIG. 5B. Housing 42 includes an inner shell 48 and an outer shell 49 and is coupled to rolling base 20. Motion blocker 44 is mounted in housing 42 to slide within housing 42 as suggested in FIG. 14. Lever 46 is coupled to fold handle 40 of pivot lock 30 and is mounted to rolling base 20 to pivot when a caregiver pulls fold handle 40 upwardly.

Figure 6:
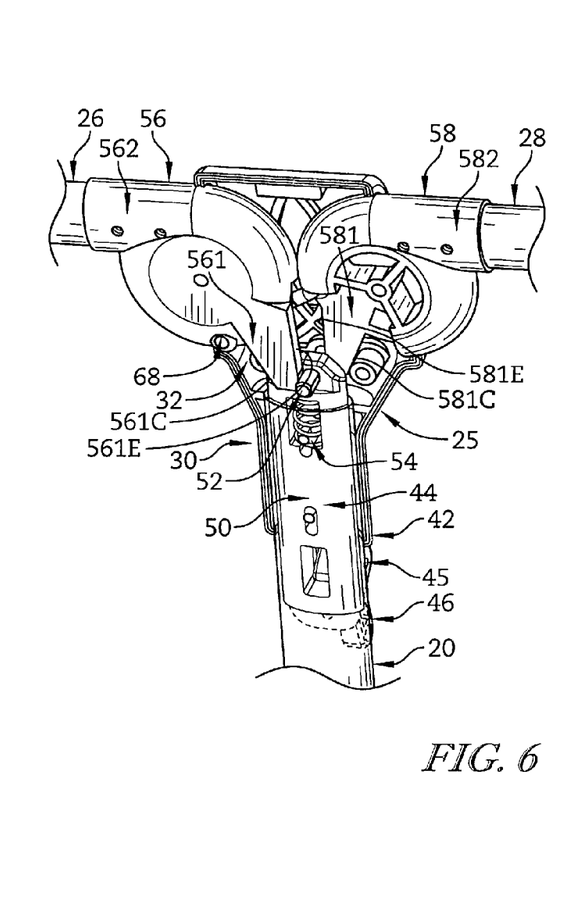
FIG. 6 is a perspective view of the left lock unit included in the pivot lock of the frame-motion controller corresponding to the mobile cart of FIG. 2 showing the motion blocker of the left lock unit blocking movement of the base stabilizer and the base pusher relative to the rolling base before the motion blocker slides within the housing to allow movement of the base stabilizer and the base pusher as shown in FIGS. 8 and 10.
Figure 10:
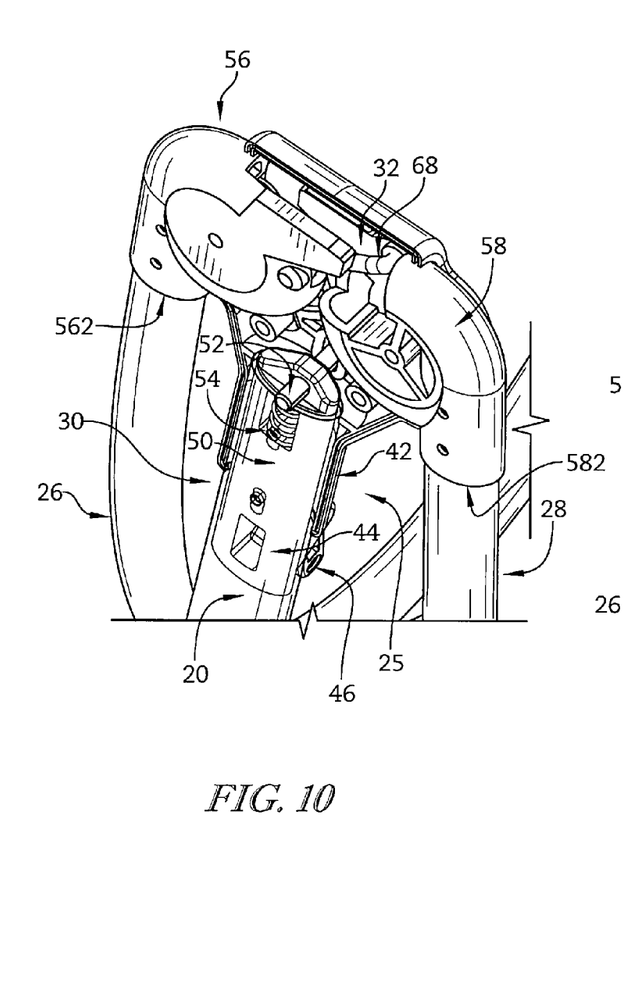
FIG. 10 is a perspective view of the left lock unit included in the pivot lock of the frame-motion controller corresponding to the mobile cart of FIG. 4 showing the motion blocker of the left lock unit remaining in the unlocked position to allow movement of the base stabilizer and the base pusher relative to the rolling base so that the foldable frame can be moved back to the folded-out position from the folded-in position.

Motion blocker 44 slides between a first position shown in FIG. 6 and arranged to block the components 26, 28 of the foldable frame 24 from pivoting about their respective axes 26A, 28A and a second position shown in FIG. 10 and arranged to allow the components 26, 28 of the foldable frame 24 to pivot about their respective axes 26A, 28A. Motion blocker 44 illustratively includes a slide 50, a blocker pin 52, and a bias spring 54 as shown in FIG. 5B. Slide 50 is mounted in housing 42 and partially in corresponding right leg 222 of rolling base 20 to slide therein. Slide 50 also supports blocker pin 52. Blocker pin 52 is arranged to block fingers (sometimes called tabs) 561, 581 of pivot hubs 56, 58 included in base stabilizer 26 and base pusher 28, respectively, when motion blocker 44 is in the first position. Bias spring 54 is arranged to act between housing 42 and slide 50 to bias motion blocker 44 toward the first position blocking components 26, 28 of the foldable frame 24 from pivoting.

Lever 46 is coupled to rolling base 20 by a bracket 45 to pivot about a lever-pivot axis 46A as shown in FIG. 5B. Lever 46 engages slide 50 of motion blocker 44 to push motion blocker 44 to the second position arranged to allow the components 26, 28 of foldable frame 24 to pivot when a user pulls fold handle 40 upwardly as suggested in FIG. 14.

Figure 7:
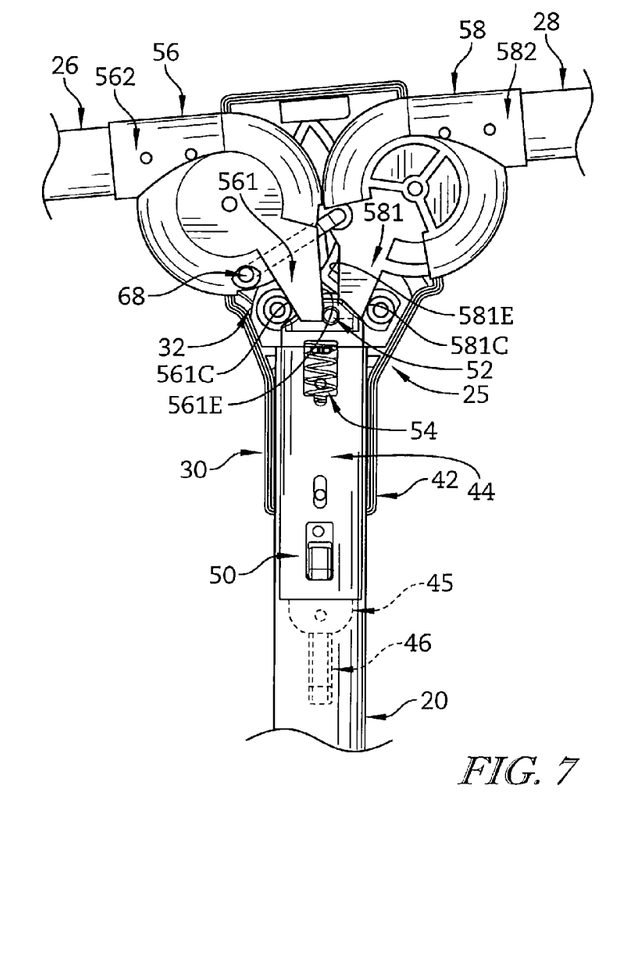
FIG. 7 is a side elevation view similar to FIG. 6 showing the movement linkage of the frame-motion controller corresponding to the mobile cart of FIG. 2 in which the movement linkage interconnects the base stabilizer and the base pusher to coordinate movement of the base stabilizer and the base pusher during motion of the foldable frame from the folded-out position to the folded-in position as shown in FIGS. 9 and 11.
Figure 8:
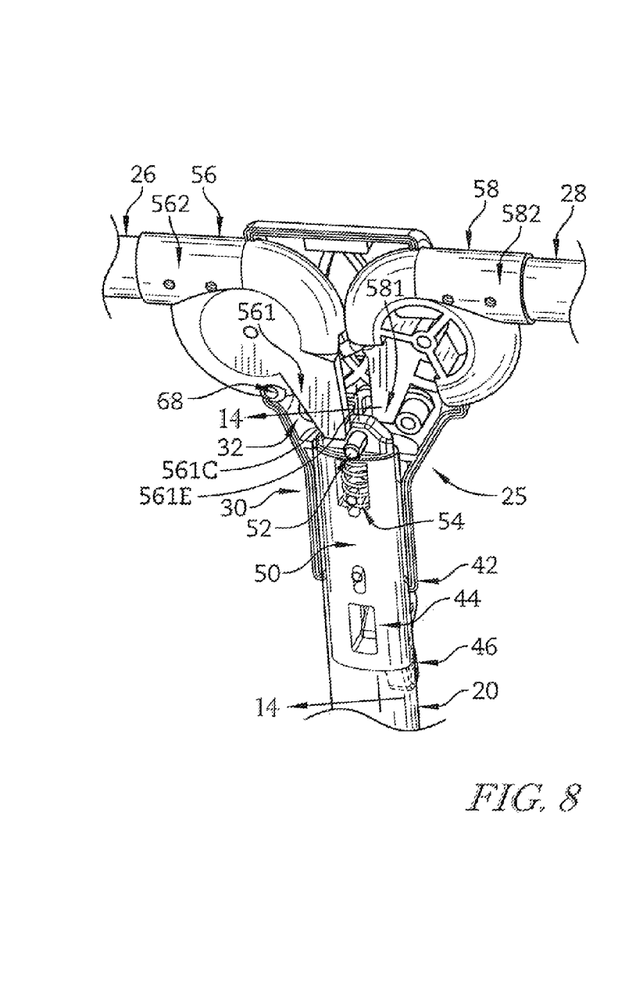
FIG. 8 is a perspective view of the left lock unit included in the pivot lock of the frame-motion controller corresponding to the mobile cart of FIG. 3 showing the motion blocker of the left lock unit moved to allow movement of the base stabilizer and the base pusher relative to the rolling base so that the foldable frame can be moved to the folded-in position from the folded-out position as shown in FIG. 10.
Figure 9:
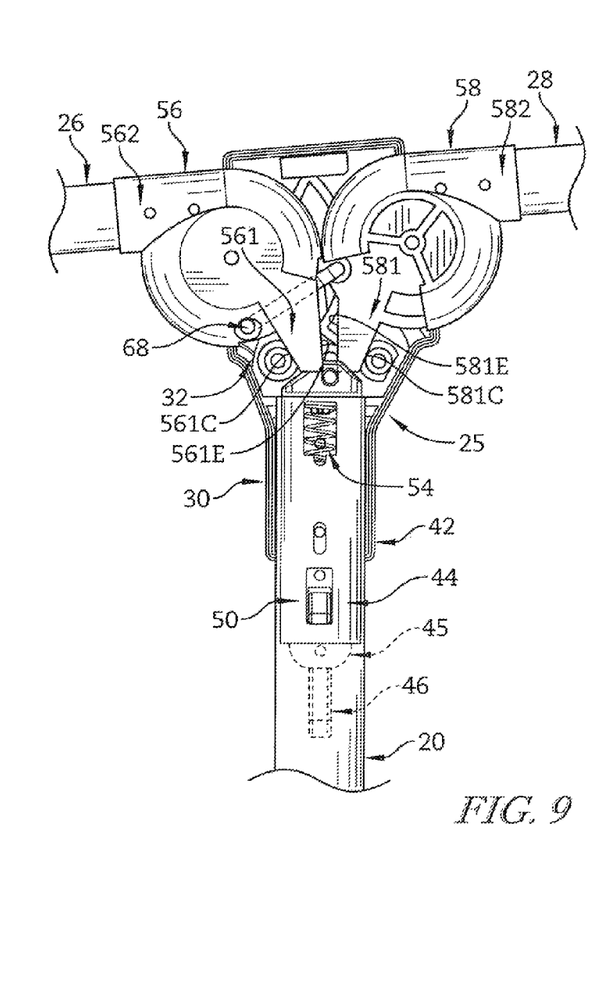
FIG. 9 is a side elevation view similar to FIG. 8 showing the movement linkage of the frame-motion controller corresponding to the mobile cart of FIG. 3 in which the movement linkage interconnects the base stabilizer and the base pusher prior to motion of the foldable frame to the folded-in position from the folded-out position as shown in FIG. 11.
Figure 11:
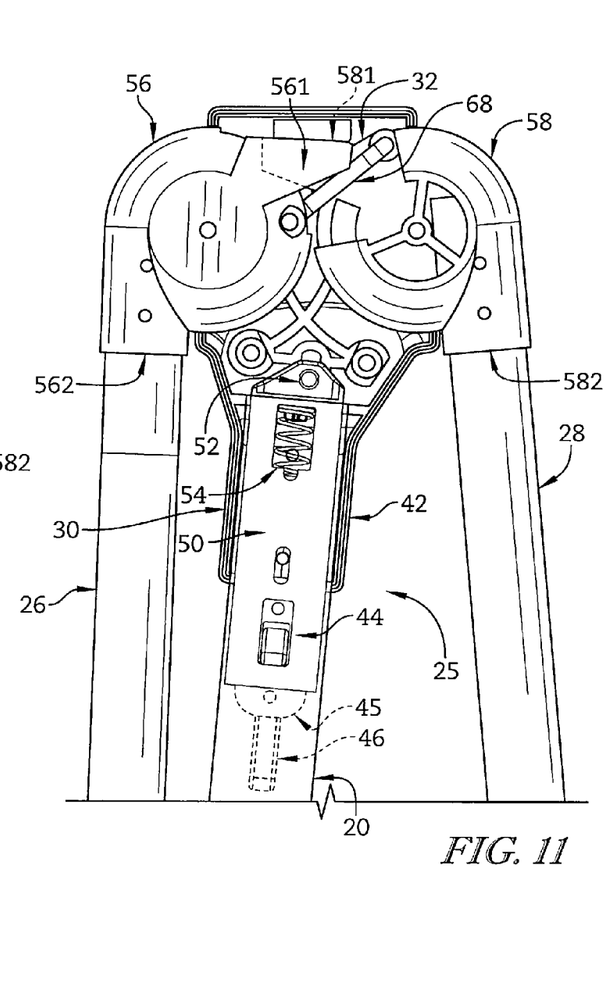
FIG. 11 is a side elevation view similar to FIG. 10 showing the movement linkage of the frame-motion controller corresponding to the mobile cart of FIG. 3 in which the movement linkage interconnects the base stabilizer and the base pusher during motion of the foldable frame to the folded-in position from the folded-out position.
Figure 12:
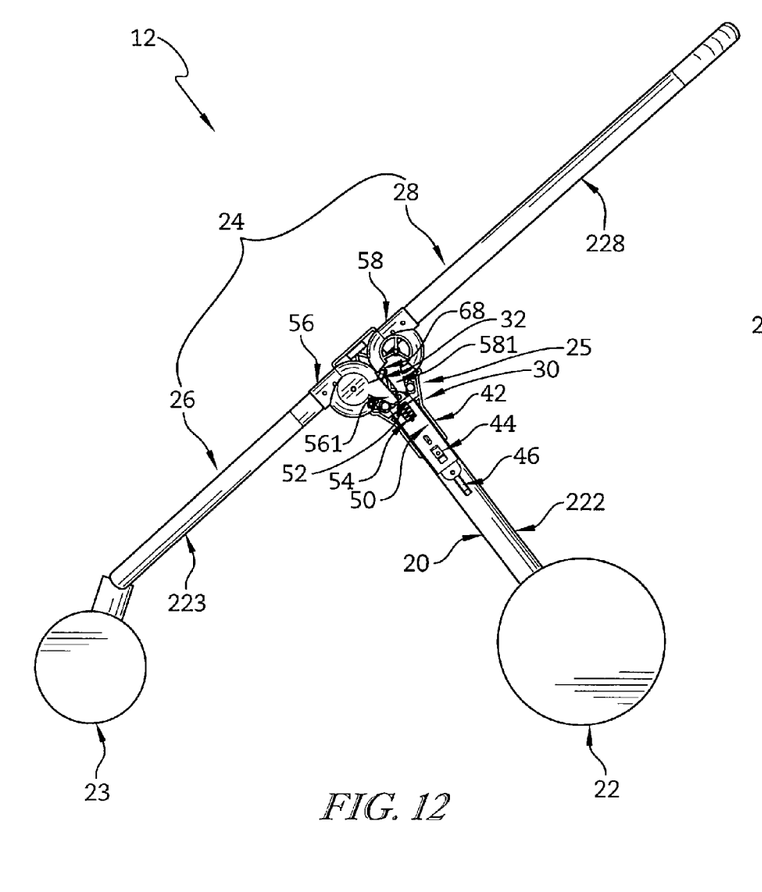
FIG. 12 is a side elevation view of the mobile cart corresponding to the mobile cart of FIG. 2 showing the foldable frame of the mobile cart in the folded-out position and the pivot lock of the frame-motion controller in the locked position blocking movement of the foldable frame to the folded-in position.

Movement linkage 32 of frame-motion controller 25 includes left and right links 66, 68 that couple base stabilizer 26 and base pusher 28 as suggested in FIG. 5B. The left and right links 66, 68 are configured to coordinate movement of base stabilizer 26 and base pusher 28 during motion of foldable frame 24 between the folded-out position and the folded-in position as suggested in FIGS. 7, 9, and 11.

Each link 66, 68 of movement linkage 32 is pivotably coupled to a stabilizer-link support 76 included in pivot hub 56 of base stabilizer 26 and to a pusher-link support 78 included in pivot hub 58 of base pusher 28. The stabilizer-link support 76 is offset from the stabilizer-pivot axis 26A about which base stabilizer 26 pivots relative to rolling base 20 and pusher-link support 78 is offset from the pusher-pivot axis 28A about which base pusher 28 pivots relative to rolling base 20. Each link 66, 68 of movement linkage 32 is illustratively a generally z-shaped rod with ends 681, 682 received in a stabilizer-link support 76 and in a pusher-link support 78 for rotative bearing engagement therewith.

Seat 14 is illustratively made from fabric stretched across a frame as suggested in FIG. 1. Seat 14 includes a seat bottom 15 and a seat back 16. Fold handle 40 extends through the seat 14 at the intersection of seat bottom 15 and seat back 16 so that fold handle 40 is available to caregivers when a child is not supported on seat 14 of stroller 10.

Rolling base 20 in the illustrative embodiment has two spaced-apart, generally straight legs 201, 202 as shown in FIG. 1. In some embodiments, a cross-member may extend between legs 201, 202. In addition, a brake system may be integrated into each rear wheel 21, 22 or more generally into rolling base 20.

Base stabilizer 26 of the foldable frame 24 illustratively includes a front wheel 23, a U-shaped stabilizer frame member 223, and pivot hubs 56 as suggested in FIGS. 5A and 5B. Front wheel 23 is coupled to U-shaped stabilizer frame member 223 at the apex of frame member 223 and is arranged to engage ground underlying collapsible stroller 10. U-shaped frame member 223 extends between left and right pivot hubs 56 and provides a footrest for a child seated on collapsible stroller 10. In some embodiments, base stabilizer 26 may include two or more wheels.

Each of the left and the right pivot hubs 56 included in the base stabilizer 26 is coupled to a corresponding housing 42 for rotation about axis 26A as shown in FIG. 1. Each pivot hub 56 is formed to include a finger 561 and a stabilizer frame receiver 562 as shown in FIGS. 5B and 6-11. Each finger 561 extends away from the stabilizer frame member 223 and is engaged by the motion blockers of the corresponding left and right pivot locks 36, 38 to block rotation of base stabilizer 26 relative to rolling base 20 when foldable frame 24 is in the folded-out position and motion blockers 44 of left and right pivot locks 36, 38 are in the locked position. Each stabilizer frame receiver 562 receives a portion of the stabilizer frame member 223 to couple the left and the right pivot hubs 56 to the stabilizer frame member 223.

In the illustrative embodiment, fingers 561 of pivot hubs 56 included in base stabilizer 26 are shaped to move left and right pivot locks 36, 38 to the unlocked position during expansion of collapsible stroller 10 so that a user need not lift fold handle 40 when unfolding foldable frame 24. In the exemplary embodiment, fingers 561 of pivot hubs 56 are formed to include an engagement surface 561E and a cam surface 561C as shown in FIG. 5B.

Engagement surface 561E of each of finger 561 is arranged to extend at a right angle from stabilizer frame member 223 and to be engaged by motion blockers 44 of corresponding left and right pivot locks 36, 38 to block rotation of base stabilizer 26 relative to rolling base 20 when foldable frame 24 is in the folded-out position and motion blockers 44 of left and the right pivot locks 36, 38 are in the locked position. Cam surface 561C of each of fingers 561 included in base stabilizer 26 are arranged to extend at an obtuse cam angle from stabilizer frame member 223 and to push pins 52 of motion blockers 44 included in pivot locks 36, 38 from the locked position to the unlocked position during movement of foldable frame 24 from the folded-in position to the folded-out position.

Base pusher 28 of foldable frame 24 illustratively includes a U-shaped pusher frame member 228 and pivot hubs 58 as suggested in FIGS. 5A and 5B. U-shaped pusher frame member 228 extends between left and right pivot hubs 58 and forms the push handle 31 of stroller 10 which is adapted to be pushed by a caregiver driving collapsible stroller 10.

Each of the left and the right pivot hubs 58 included in the base pusher 28 is coupled to a corresponding housing 42 for rotation about axis 28A as shown in FIG. 1. Each pivot hub 58 is formed to include a finger 581 and a pusher frame receiver 582 as shown in FIGS. 5B and 6-11. Each finger 581 extends away from the pusher frame member 228 and is engaged by motion blockers 44 of the corresponding left and right pivot locks 36, 38 to block rotation of base pusher 28 relative to rolling base 20 when foldable frame 24 is in the folded-out position and motion blockers 44 of left and right pivot locks 36, 38 are in the locked position. Each pusher frame receiver 582 receives a portion of the pusher frame member 228 to couple the left and the right pivot hubs 58 to the pusher frame member 228.

In the illustrative embodiment, fingers 581 of pivot hubs 58 included in base pusher 28 are shaped to move left and right pivot locks 36, 38 to the unlocked position during expansion of collapsible stroller 10 so that a user need not lift fold handle 40 when unfolding foldable frame 24. In the exemplary embodiment, fingers 581 of pivot hubs 58 are formed to include an engagement surface 581E and a cam surface 581C as shown in FIG. 5B.

Engagement surface 581E of each of finger 581 is arranged to extend at a right angle from pusher frame member 228 and to be engaged by motion blockers 44 of corresponding left and right pivot locks 36, 38 to block rotation of base pusher 28 relative to rolling base 20 when foldable frame 24 is in the folded-out position and motion blockers 44 of left and the right pivot locks 36, 38 are in the locked position. Cam surface 581C of each of fingers 581 of pivot hubs 58 included in base pusher 28 is arranged to extend at an obtuse cam angle from pusher frame member 228 and to push pins 52 of motion blockers 44 included in pivot locks 36, 38 from the locked position to the unlocked position during movement of foldable frame 24 from the folded-in position to the folded-out position.

A folding stroller concept in accordance with the present disclosure provides a method of synchronizing the movement of the metal tubes 223, 228 as stroller 10 is folded and unfolded. The locking method includes a lock lever 46 that directly pushes on the lock slider 44. The smaller ends of the two lock lever parts 46 are connected by a cloth webbing strap 40. Pulling up on the cloth strap 40 has the effect of pulling the lower ends of the two lock levers 46 towards each other, which pulls the lock slider 44 down. Initially, the lock pin 52 in the lock slider 44 is between extended tabs 561, 581 on the lower parts of the hub front 56 and hub back 58, preventing them from moving towards each other, which locks the system in the open position. But when the lock slider 44 moves down, the lock pin 52 is free of this gap between the hubs 56, 58, and the stroller 10 is free to fold.

The invention claimed is:

1. A mobile cart adapted for use in a stroller, the mobile cart comprising
a rolling base including a left wheeled leg and a right wheeled leg,
a foldable frame including a base stabilizer coupled to the rolling base to pivot about a frame axis and a base pusher coupled to the rolling base to pivot about a pusher axis, and
a frame-motion controller adapted to provide fold means for releasing the foldable frame to move from a folded-out position in which the base stabilizer and the base pusher extend away from the rolling base to support a child sitting on a seat mounted to the mobile cart when the mobile cart is in use to a folded-in position in which the base stabilizer and the base pusher extend along the rolling base reducing the footprint of the mobile cart to allow storage of the mobile cart in response to a user lifting upwardly with one hand on a fold handle included in the frame-motion controller and
for coordinating movement of the base stabilizer included in the foldable frame and the base pusher included in the foldable frame as they move from the folded-out position to the folded-in position in response to continued upward lifting of the fold handle with one hand by a user that causes a gravitational force to pull the base stabilizer and the base pusher of the foldable frame toward the folded-in position so that a user can move the foldable frame from the folded-out position to the folded-in position for storage using only a first hand freeing a second hand to carry a child,
wherein the frame-motion controller includes a left pivot lock coupled to the left wheeled leg along a left side of the rolling base, a right pivot lock coupled to the right wheeled leg along a right side of the rolling base, and the fold handle that interconnects the left pivot lock and the right pivot lock,
wherein each of the left pivot lock and the right pivot lock includes a motion blocker coupled to the rolling base to slide relative to the rolling base from a locked position arranged to block the base stabilizer included in the foldable frame and the base pusher included in the foldable frame from rotation relative to the rolling base when the foldable frame is in the folded-out position to an unlocked position arranged to allow the base stabilizer included in the foldable frame and the base pusher included in the foldable frame to rotate relative to the rolling base when the foldable frame is in the folded-out position, and
wherein the base stabilizer includes a stabilizer frame member, a left pivot hub coupled to the stabilizer frame member, and a right pivot hub coupled to the stabilizer frame member, each of the left and the right pivot hubs is formed to include a stabilizer frame receiver that receives a portion of the stabilizer frame member to couple the left and the right pivot hubs to the stabilizer frame member and a finger that extends away from the stabilizer frame member, and the fingers of the left and the right pivot hubs included in the base stabilizer are engaged by the motion blockers of the corresponding left and right pivot locks to block rotation of the base stabilizer relative to the rolling base when the foldable frame is in the folded-out position and the motion blockers of the left and the right pivot locks are in the locked position.

2. The mobile cart of claim 1, wherein each of the left and the right pivot locks includes a biasing member arranged to bias the corresponding motion blocker toward the locked position, each of the fingers of the left and the right pivot hubs included in the base stabilizer is formed to include an engagement surface and a cam surface, the engagement surface of each of the fingers of the left and the right pivot hubs included in the base stabilizer is arranged to extend at a right angle from the stabilizer frame member and to be engaged by the motion blockers of the corresponding left and right pivot locks to block rotation of the base stabilizer relative to the rolling base when the foldable frame is in the folded-out position and the motion blockers of the left and the right pivot locks are in the locked position, and the cam surface of each of the fingers of the left and the right pivot hubs included in the base stabilizer is arranged to extend at a cam angle from the stabilizer frame member and to push the motion blockers of the corresponding left and right pivot locks from the locked position to the unlocked position during movement of the foldable frame from the folded-in position to the folded-out position.

3. The mobile cart of claim 1, wherein the base pusher includes a pusher frame member, a left pivot hub coupled to the pusher frame member, and a right pivot hub coupled to the pusher frame member, each of the left and the right pivot hubs is formed to include a pusher frame receiver that receives a portion of the pusher frame member to couple the left and the right pivot hubs to the pusher frame member and a finger that extends away from the pusher frame member, and the fingers of the left and the right pivot hubs included in the base pusher are engaged by the motion blockers of the corresponding left and right pivot locks to block rotation of the base pusher relative to the rolling base when the foldable frame is in the folded-out position and the motion blockers of the left and the right pivot locks are in the locked position.

4. The mobile cart of claim 3, wherein each of the fingers of the left and the right pivot hubs included in the base pusher is formed to include an engagement surface and a cam surface, the engagement surface of each of the fingers of the left and the right pivot hubs included in the base pusher is arranged to extend at a right angle from the pusher frame member and to be engaged by the motion blockers of the corresponding left and right pivot locks to block rotation of the base pusher relative to the rolling base when the foldable frame is in the folded-out position and the motion blockers of the left and the right pivot locks are in the locked position, and the cam surface of each of the fingers of the left and the right pivot hubs included in the base pusher are arranged to extend at a cam angle from the pusher frame member and to push the motion blockers of the corresponding left and right pivot locks from the locked position to the unlocked position during movement of the foldable frame from the folded-in position to the folded-out position.

5. The mobile cart of claim 3, wherein each of the left and the right pivot locks includes a housing coupled to the rolling base and at least a portion of the motion blocker, the fingers of the left and the right pivot hubs included in the rolling base stabilizer, and the fingers of the left and the right pivot hubs included in the base pusher are arranged inside the housings of the left and the right pivot locks.

6. The mobile cart of claim 1, wherein the frame-motion controller includes a left link and a right link adapted to coordinate movement of the base stabilizer and the base pusher during motion of the foldable frame between the folded-out position and the folded-in position, the left link is coupled to the base stabilizer to pivot relative to the base stabilizer and coupled to the base pusher to pivot relative to the base pusher, and the right link is coupled to the base stabilizer to pivot relative to the base stabilizer and coupled to the base pusher to pivot relative to the base pusher.

7. A mobile cart adapted for use in a stroller, the mobile cart comprising
    a rolling base including a left wheeled leg and a right wheeled leg,
    a foldable frame including a base stabilizer coupled to the rolling base to pivot about a frame axis and a base pusher coupled to the rolling base to pivot about a pusher axis, and
    a frame-motion controller adapted to provide fold means for releasing the foldable frame to move from a folded-out position in which the base stabilizer and the base pusher extend away from the rolling base to support a child sitting on a seat mounted to the mobile cart when the mobile cart is in use to a folded-in position in which the base stabilizer and the base pusher extend along the rolling base reducing the footprint of the mobile cart to allow storage of the mobile cart in response to a user lifting upwardly with one hand on a fold handle included in the frame-motion controller and
    for coordinating movement of the base stabilizer included in the foldable frame and the base pusher included in the foldable frame as they move from the folded-out position to the folded-in position in response to continued upward lifting of the fold handle with one hand by a user that causes a gravitational force to pull the base stabilizer and the base pusher of the foldable frame toward the folded-in position so that a user can move the foldable frame from the folded-out position to the folded-in position for storage using only a first hand freeing a second hand to carry a child,
        wherein the frame-motion controller includes a left link and a right link adapted to coordinate movement of the base stabilizer and the base pusher during motion of the foldable frame between the folded-out position and the folded-in position, the left link is coupled to the base stabilizer to pivot relative to the base stabilizer and coupled to the base pusher to pivot relative to the base pusher, and the right link is coupled to the base stabilizer to pivot relative to the base stabilizer and coupled to the base pusher to pivot relative to the base pusher, and
        wherein each of the left and the right link included in the movement linkage is coupled to a stabilizer-link support included in the base stabilizer and to a pusher-link support included in the base pusher, the stabilizer-link support is offset from the pivot axis about which the base stabilizer pivots relative to the rolling base, and the pusher-link support is offset from the pivot axis about which the base pusher pivots relative to the rolling base.

8. A mobile cart comprising
    a rolling base including a left wheeled leg and a right wheeled leg,
    a foldable frame including a base stabilizer coupled to the rolling base to pivot about a stabilizer axis and a base pusher coupled to the rolling base to pivot about a pusher axis, the foldable frame movable from a folded-out position in which the base stabilizer and the base pusher extend away from the rolling base to a folded-in position in which the base stabilizer and the base pusher extend along the rolling base, and a frame-motion controller movable from a locked mode in which the foldable frame is blocked from movement away from the folded-out position to an unlocked mode in which the foldable frame is allowed to move away from the folded-out position, the frame-motion controller including a left pivot lock coupled to the left wheeled leg along a left side of the rolling base, a right pivot lock coupled to the right wheeled leg along a right side of the rolling base, and the fold handle that interconnects the left pivot lock and the right pivot lock, wherein each of the left pivot lock and the right pivot lock includes a motion blocker coupled to the rolling base to slide relative to the rolling base from a locked position arranged to block the base stabilizer included in the foldable frame and the base pusher included in the foldable frame from rotation relative to the rolling base when the foldable frame is in the folded-out position to an unlocked position arranged to allow the base stabilizer included in the foldable frame and the base pusher included in the foldable frame to rotate relative to the rolling base when the foldable frame is in the folded-out position, wherein each of the left pivot lock and the right pivot lock includes a lever coupled to the fold handle and to the rolling base to pivot relative to the rolling base from a first position disengaged from the corresponding left or right motion blocker to a second position engaged with the corresponding left or right motion blocker to push the corresponding left or right motion blocker from the locked position to the unlocked position, and wherein the base stabilizer includes a stabilizer frame member, a left pivot hub coupled to the stabilizer frame member, and a right pivot hub coupled to the stabilizer frame member, each of the left and the right pivot hubs is formed to include a stabilizer frame receiver that receives a portion of the stabilizer frame member to couple the left and the right pivot hubs to the stabilizer frame member and a finger that extends away from the stabilizer frame member, and the fingers of the left and the right pivot hubs included in the base stabilizer are engaged by the motion blockers of the corresponding left and right pivot locks to block rotation of the base stabilizer relative to the rolling base when the foldable frame is in the folded-out position and the motion blockers of the left and the right pivot locks are in the locked position.

9. The mobile cart of claim 8, wherein each of the left and the right pivot locks includes a biasing member arranged to bias the corresponding motion blocker toward the locked position, each of the fingers of the left and the right pivot hubs included in the base stabilizer is formed to include an engagement surface and a cam surface, the engagement surface of each of the fingers of the left and the right pivot hubs included in the base stabilizer is arranged to extend at a right angle from the stabilizer frame member and to be engaged by the motion blockers of the corresponding left and right pivot locks to block rotation of the base pusher relative to the rolling base when the foldable frame is in the folded-out position and the motion blockers of the left and the right pivot locks are in the locked position, and the cam surface of each of the fingers of the left and the right pivot hubs included in the base stabilizer is arranged to extend at a cam angle from the stabilizer frame member and to push the motion blockers of the corresponding left and right pivot locks from the locked position to the unlocked position during movement of the foldable frame from the folded-in position to the folded-out position.

10. The mobile cart of claim 8, wherein the base pusher includes a pusher frame member, a left pivot hub coupled to the pusher frame member, and a right pivot hub coupled to the pusher frame member, each of the left and the right pivot hubs is formed to include a pusher frame receiver that receives a portion of the pusher frame member to couple the left and the right pivot hubs to the pusher frame member and a finger that extends away from the pusher frame member, and the fingers of the left and the right pivot hubs included in the base pusher are engaged by the motion blockers of the corresponding left and right pivot locks to block rotation of the base pusher relative to the rolling base when the foldable frame is in the folded-out position and the motion blockers of the left and the right pivot locks are in the locked position.

11. The mobile cart of claim 8, wherein the frame-motion controller includes a left link and a right link adapted to coordinate movement of the base stabilizer and the base pusher during motion of the foldable frame between the folded-out position and the folded-in position, the left link is coupled to the base stabilizer to pivot relative to the base stabilizer and coupled to the base pusher to pivot relative to the base pusher, and the right link is coupled to the base stabilizer to pivot relative to the base stabilizer and coupled to the base pusher to pivot relative to the base pusher.

12. A mobile cart comprising a rolling base including a left wheeled leg and a right wheeled leg, a foldable frame including a base stabilizer coupled to the rolling base to pivot about a stabilizer axis and a base pusher coupled to the rolling base to pivot about a pusher axis, the foldable frame movable from a folded-out position in which the base stabilizer and the base pusher extend away from the rolling base to a folded-in position in which the base stabilizer and the base pusher extend along the rolling base, and a frame-motion controller movable from a locked mode in which the foldable frame is blocked from movement away from the folded-out position to an unlocked mode in which the foldable frame is allowed to move away from the folded-out position, the frame-motion controller including a left pivot lock coupled to the left wheeled leg along a left side of the rolling base, a right pivot lock coupled to the right wheeled leg along a right side of the rolling base, and the fold handle that interconnects the left pivot lock and the right pivot lock, wherein the frame-motion controller includes a left link and a right link adapted to coordinate movement of the base stabilizer and the base pusher during motion of the foldable frame between the folded-out position and the folded-in position, the left link is coupled to the base stabilizer to pivot relative to the base stabilizer and coupled to the base pusher to pivot relative to the base pusher, and the right link is coupled to the base stabilizer to pivot relative to the base stabilizer and coupled to the base pusher to pivot relative to the base pusher, and wherein each of the left and the right link included in the movement linkage is coupled to a stabilizer-link support included in the base stabilizer and to a pusher-link support included in the base pusher, the stabilizer-link support is offset from the pivot axis about which the base stabilizer pivots relative to the rolling base, and the pusher-link support is offset from the pivot axis about which the base pusher pivots relative to the rolling base.

13. The mobile cart of claim 12, wherein each of the left and the right link included in the movement linkage is a generally z-shaped rod with ends received in the stabilizer-link support and in the pusher-link support.

\* \* \* \* \*